United States Patent [19]

Vrabel

[11] 4,103,547

[45] Aug. 1, 1978

[54] LOCOMOTIVE TRACK CURVATURE INDICATOR

[75] Inventor: Joseph D. Vrabel, Concord, Mass.

[73] Assignee: The United States of America as represented by the Secretary of the Department of Transportation, Washington, D.C.

[21] Appl. No.: 765,876

[22] Filed: Feb. 7, 1977

[51] Int. Cl.² ............................................ G01M 17/02
[52] U.S. Cl. ......................................... 73/146; 33/1 Q
[58] Field of Search .................... 73/146; 33/287, 144, 33/146, 1 Q

[56] References Cited

U.S. PATENT DOCUMENTS

| 3,126,633 | 3/1964 | Plasser et al. | 33/1 Q |
| 3,869,907 | 3/1975 | Plasser et al. | 73/146 |

FOREIGN PATENT DOCUMENTS 2,512,739  10/1975  Fed. Rep. of Germany ............ 33/1 Q

*Primary Examiner*—Donald O. Woodiel
*Attorney, Agent, or Firm*—Herbert E. Farmer; Harold P. Deeley, Jr.; Otto M. Wildensteiner

[57] ABSTRACT

A system for dynamically measuring and displaying track curvature information to a locomotive engineer on a real-time basis. A car mounted sensor produces a variable output responsive to changes in the car's orientation caused by variation in track curvature, a control circuit converts the sensor output into an electrical signal representative of the changes in orientation, and an indicator receives the signal and provides a dynamic display of the derived track curvature information. In a preferred embodiment, the sensor comprises an extendable line having one end attached to a bracket that is connected to the center of a supporting truck crossframe, while the other end is wound on a retractable supply reel mounted on the car's frame. In response to relative movement between the car's frame and the supporting truck, caused by movement of the car over curved track, the length of the line withdrawn from the reel varies and is monitored by an electrical potentiometer that produces an output signal indicative of track curvature.

8 Claims, 6 Drawing Figures

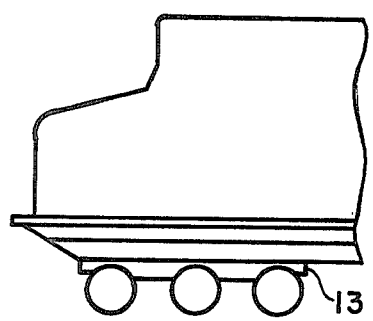
FIG. IA
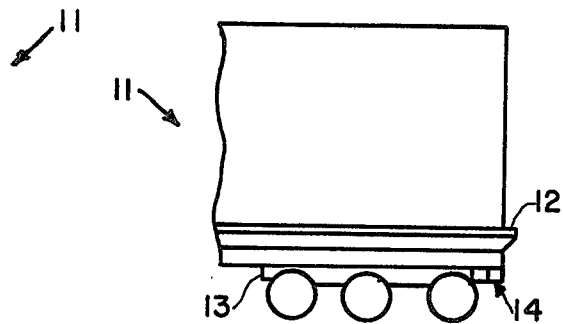
FIG. IB
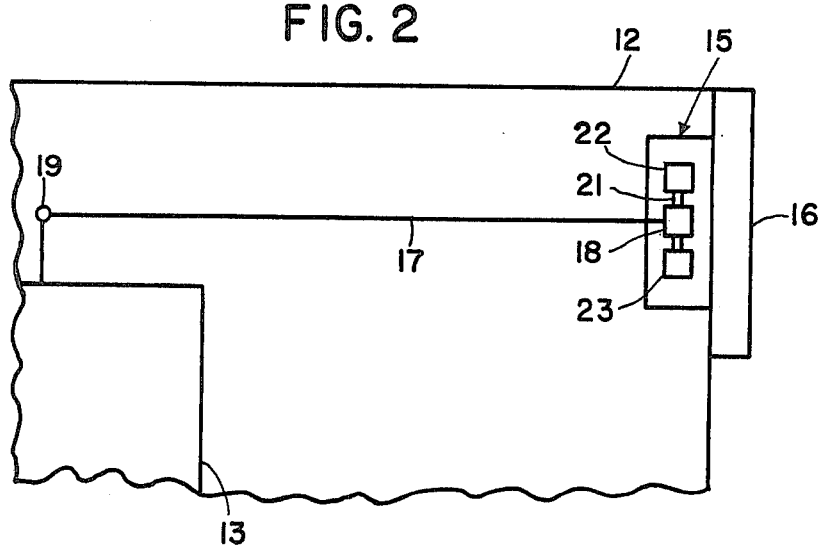
FIG. 2

LOCOMOTIVE TRACK CURVATURE INDICATOR

ORIGIN OF THE INVENTION

The invention described herein was made by an employee of the U.S. Government and may be manufactured and used by or for the Government for Governmental purposes without the payment of any royalties thereon or therefor.

BACKGROUND OF THE INVENTION

This invention relates to a railroad accessory for reducing the occurrences of railroad car derailments by dynamically indicating the curvature of track being negotiated by a railroad car retaining the accessory.

Car derailments constitute one of the largest single sources of loss incurred by modern railroads. In addition to producing heavy damage to equipment and cargo, derailments necessitate extensive labor commitments for restoring equipment to service and, even more significantly, serious losses result from the interruption of revenue-producing activities during those periods that normal rail service is interrupted. Although many complicated parameters contribute to the various causes of derailment, all such parameters are influenced by the degree of curvature of the tracks on which a train is running. Consequently, the incidence of derailment could be reduced if locomotive engineers possessed accurate, real-time knowledge of the track curvature being negotiated by their trains.

At the present time railroads employ conventional surveying techniques to derive track curvature data that is tabulated in chart form. These charts are used for various purposes but are not normally made available to locomotive engineers. In any case, the availability of such charts would be more of a detriment than an advantage to an engineer since the attention required to follow the charted data would distract the engineer from other critically important duties. Furthermore, the engineer would be unable at all times to accurately identify the specific track curvature data associated with a current position of his train. For these reasons, locomotive engineers presently rely only on past experience and intuitive judgment to determine the critically important parameter of track curvature.

The object of this invention, therefore, is to provide a reliable system for providing locomotive engineers with accurate, real-time track curvature information.

SUMMARY OF THE INVENTION

The invention is a system for first dynamically measuring track curvature and then displaying the derived information to a locomotive engineer on a real-time basis. The system includes a car mounted sensor that produces a variable output responsive to changes in the car's orientation caused by variation in track curvature, a control circuit for converting the sensor output into an electrical signal representative of the track curvature causing the changes in orientation, and an indicator for receiving the signal and providing a dynamic display of the derived track curvature information. In a preferred embodiment, the sensor comprises an extendable line having one end attached to a bracket that is connected to the center of a supporting truck cross-frame, while the other end is wound on a retractable supply reel mounted on the car's frame. In response to relative movement between the car's frame and the supporting truck, caused by movement of the car over curved track, the length of the line withdrawn from the reel varies and is monitored by an electrical potentiometer that produces an output signal indicative of track curvature.

According to one feature of the invention, a noise component in the potentiometer output signal is removed by a low pass filter, the response of which is dependent upon train speed. At higher speeds the cut-off frequency of the filter is increased so as to prevent the loss of desired signal information that is generated at high train speeds.

DESCRIPTION OF THE DRAWINGS

These and other objects and features of the invention will become more apparent upon a perusal of the following description taken in conjunction with the accompanying drawings wherein:

FIG. 1A and FIG. 1B is a schematic representation of a locomotive utilizing the invention;

FIG. 2 is a schematic illustration of a sensor device utilized on the locomotive of FIG. 1;

DESCRIPTION OF THE PREFERRED EMBODIMENT

Figure 3:
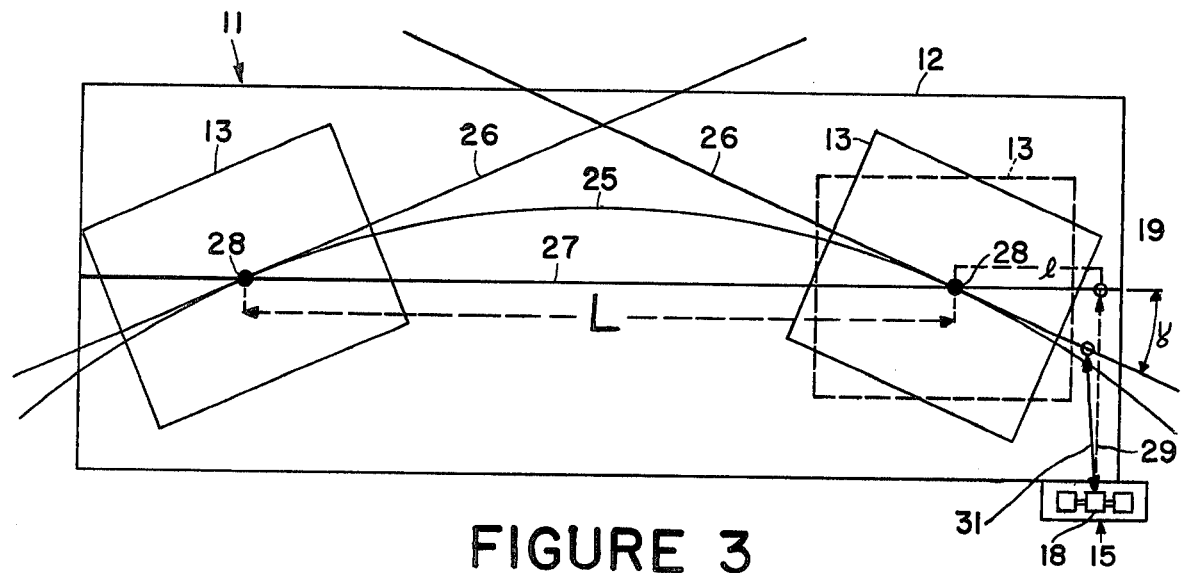
FIG. 3 is a diagram depicting the manner in which the sensor of FIG. 2 derives track curvature information.

Schematically illustrated in FIG. 1A and FIG. 1B is a conventional locomotive frame 12 pivotally supported by a pair of truck frame assemblies 13. Mounted to the underside of the locomotive frame 12 is a sensor 14 for measuring the curvature of track on which the locomotive 11 is traveling. As illustrated in FIG. 2, the sensor 14 includes a linear extensometer 15 secured to the locomotive frame 12 by a mounting bracket 16. An extendable and retractable wire 17 is retained by a wire supply reel 18 in the extensometer 15 and has an end attached to a bracket 19 connected to the center line of one of the truck frame assemblies 13. A shaft 21 couples the supply reel 18 to a tension spring 22 that exerts a retraction force on the wire 17. Also mounted for rotation with the shaft 21 is a potentiometer 23 that provides an electrical output indicative of the angular position of the supply reel 18.

FIG. 3 diagramatically illustrates the operation of the sensor 14 during movement of the locomotive 11 over track 25 which is depicted with a greatly exaggerated curvature. The truck frames 13 pivot in opposite directions from their normal positions (shown dotted for one of the trucks) into positions wherein their center lines 26 are tangent to the curvature of the track 25. This entails movement relative to the locomotive frame 12 which extends along a center line 27 defined by the centers 28 of the truck frames 13. Consequently, the original spacing 29 between the extensometer 15 and the attachment point 19 is reduced to a spacing 31 ($\delta''$) producing a retraction in the wire 17. Since the truck rotation is not large, and since the motion of the attachment point 19 is initially tangent to the motion of the wire 17, this change in wire length is almost identically proportional to the truck rotation angle $\delta°$, defined between the locomotive center line 27 and the truck frame center line 26.

Furthermore, the measured angle δ° can be directly related to the curvature of the track 25 as that curvature is defined by railroads. The methematical relationship between the measured angle δ° determined by locomotive orientation and the definition of track curvature as used by the railroads, is shown in FIG. 4.

Figure 4:
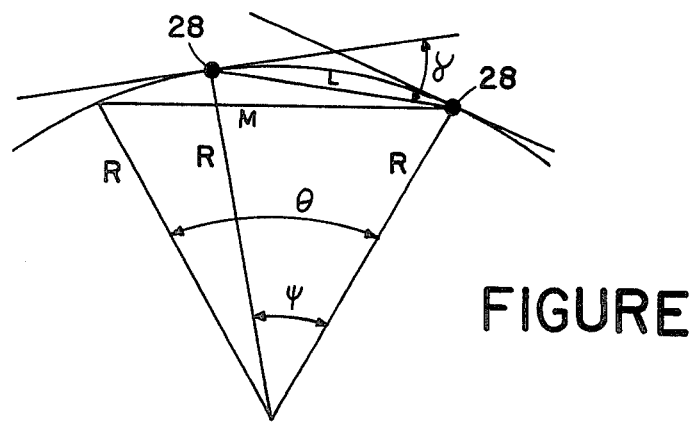
FIG. 4 is a diagram illustrating the manner in which the measurements derived by the sensor are converted into specific track curvature as defined by railroads.

From FIGS. 3 and 4:

$\Psi = 2\gamma°$, $L = 2R\sin \Psi/2 \simeq 2R\Psi/2 = R\Psi$; assuming $\sin \theta \simeq \theta$ for small angles $M = 2R\sin \theta/2 \simeq 2R\theta/2 = R\theta$, $R = R = L/\Psi = M/\theta$; assuming uniform curvature, there would be a small error for interconnecting spirals $\theta = M\Psi/L = M2/L \gamma°$ $\theta° = 2M/L \gamma°$ where;

$\theta°$ = Track Curvature in degrees (by definition)
M = 100 feet, (length typically used by railroads)
$\gamma°$ = Truck Frame to Locmotive Body Angle
$\Psi°$ = Angle Subtended by L
L = Bolster Truck Frame Center to Center Length of Locomotive
$\gamma''$ = Extension or Retraction of Extensometer Line 17 in inches, referenced to O'' at $\theta° = O°$ The track curvature is defined typically by the railroads as the angle subtended by a chord of length 100 feet.

This gives a relationship:

$\theta° = 200/L \gamma°$

The distance measured by the extensometer 15 between the locomotive frame 12 and the end 19 of the mounting bracket attached to the truck 13 is transformed by this equation into the value needed.

For a typical locomotive bolster with a truck center to truck center length L of 40 feet and a truck, center to end of bracket length $l$, of 54 inches, the following relationship of $\gamma''$ to $\theta°$ is derived:

$\theta = 200/40 \gamma°$ $\gamma° = 1/5 \theta°$, $\sin \gamma° = \gamma''/54''$, $\gamma'' = 54'' \sin \gamma°$ $\gamma'' = 54'' \sin (\theta°/5)$ $\theta° = 5 \arcsin \gamma''/54''$ The approximate relationship between the distance measured with the extensometer and the curvature value needed is:

| ± $\gamma''$ | 0 | .37 | .75 | 1.1 | 1.5 | 1.9 | 2.3 | 2.6 |
|---|---|---|---|---|---|---|---|---|
| ± $\theta°$ | 0 | 2 | 4 | 6 | 8 | 10 | 12 | 14 |

Figure 5:
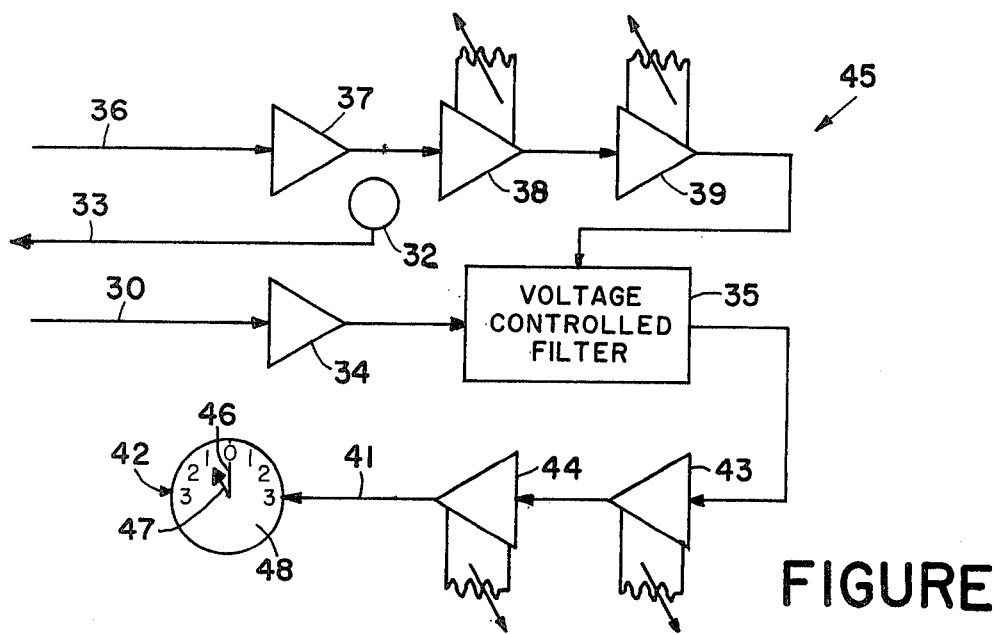
FIG. 5 is a schematic circuit diagram of a control circuit for providing and displaying track curvature information.

Referring now to FIG. 5 there is shown a control circuit 45 utilizing curvature information derived as described above. The electronics uses the approximation $\sin \theta° = \theta°$ for small angles. A voltage supply 32 provides a reference voltage on a line 33 to the potentiometer 23 of the extensometer 15 shown in FIG. 2. The variable output of the potentiometer 23 is fed on a line 30 through a voltage follower amplifier 34 to a voltage controlled filter 35. A control voltage for the filter 35 is received on a line 36 from a speedometer (not shown) that produces an output voltage dependent upon the running speed of the locomotive 11. Before being applied to the filter 35 the speed dependent signal on the line 36 is fed through a voltage follower amplifier 37 and a pair of amplifiers 38 and 39 used, respectively, to establish zero offset and to adjust gain. The filtered output of the filter 35 on a line 41 is applied to a meter 42 after being conditioned by a pair of amplifiers 43 and 44.

During use of the system, the potentiometer output signal on the line 30 is low-pass-filtered by the voltage controlled filter 35 to eliminate jitter noise caused by mechanical vibration of the sensor 14 due to locomotive vibration. The low-pass filter 35 is controlled by an input causing it to track with the train speed such that as the train speed increases, the filter cut-off frequency increases. Similarly, as the train speed decreases, the low-pass filter cut-off frequency decreases. This eliminates noise in the display at low speeds where the high frequency response is not required, but maintains the detectability of short-duration curves at higher speeds. This control is provided by a voltage output on line 36 from a locomotive speedometer (not shown). The voltage follower 37 is used as a high-impedance buffer for the speed signal on line 36 and the amplifier 38 establishes a zero-offset as required. The amplifier 39 amplifies or attenuates the signal to a range compatible with the voltage-controlled filter control input.

The low-pass filtered signal on the line 41 from the filter 35 is DC-shifted by the amplifier 43 acting as a zero-offset amplifier to adjust the signal output to zero volts at zero degrees. Next, the signal is conditioned by the variable gain amplifier 44 that adjusts the filtered and zero-offset sensor output to the calibration levels required by the display means. The final output signal on line 40 is a bipolar voltage, ±, depending on the direction of track curvature, with a magnitude proportional to the degree of curvature. This signal is displayed by the meter 42. The meter center position 46 represents 0° or tangent track. Meter needle 47 indicates the present direction of track curvature by direction of displacement, Left or Right, from the 0° position 46. The magnitude of the existing curvature is indicated by the number on the scale, 48, pointed to by the needle 46.

The amplifiers 37, 38 and 39 modify the speedometer meter voltage on line 36 to generate the proper speed-to-voltage relationship to control the low-pass frequency of the filter 35 which then filters the sensor output with the proper low-pass frequency for the current locomotive speed. The relationship between locomotive speed and desired low-pass cut-off frequency is a function of the shortest detectable curve desired. Test results have shown that the required reaction distance for the curvature display should be approximately 100 feet; that is, the display should read within approximately 10% of the actual curvature value after the locomotive is 100 feet into the curve. This value is a function of the shortest curve which a train will encounter, which is generally 300–400 feet, with a few as short as 200 feet.

To calculate low-pass frequency as a function of train speed, the following relationships are used:
  $t$ = low-pass cut-off period
  $f_{co}$ = low-pass cut-off frequency S = train speed in miles per hour
D = distance for display to settle to within 10% in ft.
T = train travel time for D ft. in seconds
D = [5280/3600] ST
T = [3600/5280] D/S = 0.68 [D/S]
$f_{cO}$ = 1/t = [65/360] 1/T, for 10% settling
$f_{cO}$ = [65/360] [S/0.68D] = 0.27 [S/D]
Assuming D = 100 feet.

$$f_{cO} = [0.27/100] \, S$$

$$f_{cO} = (0.0027) \, S$$

This is one possible relationship between the locomotive speed and the filtering frequency used on the sensor output. Obviously this could be adjusted based on further test data.

An engineer would monitor the track curvature information displayed on the meter 42 and utilize the information to modify his train handling accordingly. Changes in throttle notch, dynamic brake position, or air application are not recommended in curves greater than approximately 3°. This is especially true when the curvature is combined with a change in grade. Under these circumstances, control changes can lead to longitudinal and lateral shifting of cars, as they assume new balance positions. Dynamic car shifting will generally result in higher instantaneous force levels than quasi-static situations. Since the time duration of the dynamic shifting is short, the energies involved are not a problem unless they are unusually severe, synchronous with a track flaw or synchronous with a high degree of track curvature. Transitory car shifting can be a severe problem on curves since the situation geometry will tend to resolve generated forces into lateral, perpendicular, force components as well as tangential. This is not as severe a problem on a straight (tangent) track. Therefore, the engineer must exercise more caution on curved track sections than on tangent track. The proposed curvature display system will assist him in determining the proper control strategy for different track curvature situations.

Obviously, many modifications and variations of the present invention are possible in light of the above teachings. For example, other mechanisms could be used to measure the locomotive-to-truck angle, such as gear-driven shaft encoders, mechanical linkages or strain-gage arrangements, or alternate mounting schemes could be employed between the extensometer, truck frame and car body. Also, the circuits used to implement the signal conditioning could be changed in many ways and would be a function of the particular sensor used. In this regard, different analog filtering techniques could be used. Different functional relationships between a locomotive's speed and the control voltage applied to the voltage-controlled filter could be used, both linear and nonlinear. Finally, although a meter display appears most desirable, other methods of indication could be used, such as a series of lights, digital read-out of curvature, and integration of the information into a multi-function locomotive display system. It is to be understood, therefore, that the invention can be practiced otherwise than as specifically described.

What is claimed is:

1. Apparatus for dynamically determining track curvature and comprising:
   a railroad car comprising a car frame pivotally supported on track means;
   a sensor means for mounting on said railroad car frame, said sensor means producing a variable output responsive to rotational movement in the horizontal plane between said railroad car frame and said track means;
   control circuit means for converting said output into an electrical signal representative of the track curvature causing said rotational movement; and
   indicator means receiving said signal and providing dynamic and static indications of track curvature in response thereto.

2. Apparatus according to claim 1 wherein said sensor means comprises an extendable and retractable connector having one end connected to said car frame and an opposite end connected to said truck means so as to experience changes in length in response to said relative movement between said car frame and said truck means.

3. Apparatus according to claim 2 wherein said connector comprises a line retained by a retractable supply reel mounted on one of said car frame or truck means, said line having one end attached to the other of said car frame or truck means.

4. Apparatus according to claim 3 wherein said control circuit means comprises an electrical potentiometer coupled to said supply reel so as to provide said signal dependent upon the angular position thereof.

5. Apparatus according to claim 2 wherein said control circuit means comprises an electrical potentiometer coupled to said sensor so as to provide said signal dependent upon the length of said connector.

6. Apparatus according to claim 1 wherein said indicator means comprises a meter calibrated in degrees of measured track curvature and direction of track curvature.

7. Apparatus according to claim 1 wherein said railroad car comprises a car frame pivotally supported on truck means, and said sensor means is coupled between said car frame and said truck means so as to be responsive to relative movement therebetween.

8. Apparatus according to claim 7 wherein said sensor means comprises an extendable and retractable connector having one end connected to said car frame and an opposite end connected to said truck means so as to experience changes in length in response to said relative movement between said car frame and said truck means.

* * * * *